(12) United States Patent
Saxena et al.

(10) Patent No.: US 11,258,669 B2
(45) Date of Patent: Feb. 22, 2022

(54) DIFFERENTIAL DATAFLOW APPROACH FOR COMPUTING GROUPING MEMBERSHIP IN NETWORK CONTROLLERS

(71) Applicant: VMware, Inc., Palo Alto, CA (US)

(72) Inventors: Aayush Saxena, San Jose, CA (US); Aravinda Kidambi Srinivasan, Mountain View, CA (US); Harold Vinson C. Lim, Union City, CA (US); Shekhar Chandrashekhar, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/928,350

(22) Filed: Jul. 14, 2020

(65) Prior Publication Data

US 2022/0021584 A1    Jan. 20, 2022

(51) Int. Cl.
*H04L 12/24* (2006.01)
*H04L 41/0893* (2022.01)
*H04L 41/082* (2022.01)

(52) U.S. Cl.
CPC ........ *H04L 41/0893* (2013.01); *H04L 41/082* (2013.01)

(58) Field of Classification Search
CPC .......................... H04L 41/0893; H04L 41/082
See application file for complete search history.

(56) References Cited

U.S. PATENT DOCUMENTS

| | | | |
|---|---|---|---|
| 2010/0169887 A1* | 7/2010 | Waas | G06F 9/5027 718/102 |
| 2012/0147898 A1* | 6/2012 | Koponen | H04L 49/70 370/422 |
| 2013/0007760 A1* | 1/2013 | O'Sullivan | G06Q 10/00 718/104 |
| 2014/0172939 A1* | 6/2014 | McSherry | H04L 29/08135 709/201 |
| 2017/0317979 A1* | 11/2017 | Bansal | H04L 63/0263 |
| 2017/0318113 A1* | 11/2017 | Ganichev | H04L 67/2828 |
| 2017/0371709 A1* | 12/2017 | Harper | G06F 9/5038 |
| 2018/0123877 A1* | 5/2018 | Saxena | H04L 41/12 |
| 2018/0219726 A1* | 8/2018 | Wang | H04L 41/0853 |
| 2019/0146970 A1* | 5/2019 | Chamieh | G06F 16/284 707/718 |

* cited by examiner

*Primary Examiner* — Michael A Keller
*Assistant Examiner* — Jsing Forng Lin
(74) *Attorney, Agent, or Firm* — Patterson & Sheridan, LLP

(57) ABSTRACT

Certain embodiments described herein are generally directed to techniques for computing grouping object memberships in a network. Embodiments include receiving a plurality of network configuration updates. Embodiments include identifying delta updates to a plurality of grouping objects based on the plurality of configuration updates. Embodiments include determining a parallel processing arrangement for the delta updates based on dependencies in a directed graph comprising representations of the plurality of grouping objects. Embodiments include processing the delta updates according to the parallel processing arrangement in order to determine memberships of the plurality of grouping objects. Embodiments include distributing one or more updates to one or more endpoints based on the memberships of the plurality of grouping objects.

20 Claims, 8 Drawing Sheets

DIFFERENTIAL DATAFLOW APPROACH FOR COMPUTING GROUPING MEMBERSHIP IN NETWORK CONTROLLERS

BACKGROUND

Software defined networking (SDN) comprises a plurality of hosts in communication over a physical network infrastructure, each host having one or more virtualized endpoints such as VMs, containers, or other virtual computing instances (VCIs) that are connected to logical overlay networks that may span multiple hosts and are decoupled from the underlying physical network infrastructure. Though certain aspects are discussed herein with respect to VMs, it should be noted that they may similarly be applicable to other suitable VCIs. Furthermore, certain aspects discussed herein may similarly be applicable to physical machines. Some embodiments of the present disclosure may also be applicable to environments including both physical and virtual machines.

Any arbitrary set of VMs in a datacenter may be placed in communication across a logical Layer 2 network by connecting them to a logical switch. Each logical switch corresponds to a virtual network identifier (VNI), meaning each logical Layer 2 network can be identified by a VNI. The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain. The logical router is collectively implemented by at least one virtual router on each host or a subset of hosts. Each virtual router operates as a router implemented in software by the hypervisor on the hosts.

SDN generally involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

SDN often uses network controllers to configure logical networks throughout a datacenter. As SDN becomes more prevalent and datacenters cater to more and more tenants, controllers are expected to perform more operations. For example, a network controller may manage a plurality of managed forwarding elements (MFEs) (e.g., virtual routers, virtual switches, VTEPs, virtual interfaces, etc., running on host machines, which are physical computing devices that support execution of virtual machines (VMs) or other virtualized computing instances) that implement one or more logical networks. The MFEs may implement various logical entities (e.g., logical routers, logical switches, etc.) of each logical network. A particular logical entity may be implemented on a subset of the MFEs managed by the controller. The controller may receive an update (e.g., change to the desired state) of the particular logical entity. Accordingly, the controller may need to determine the subset of MFEs that implement the logical entity (i.e., the span of the logical entity) to send the update so the logical entity can be updated.

An important part of network configuration that is computed on a network controller is network security configuration. SDN uses the concept of grouping objects to allow groupings of different combinations of fundamental networking layer components, like internet protocol (IP) addresses, ports, media access control (MAC) addresses, L2 logical switches, L3 logical routers, and the like. Such grouping objects allow a security layer to be defined based on user defined rules that reference the grouping objects. A basic example is a security rule that blocks traffic sent from Group 1 to Group2. Group 1 and Group2 are grouping objects that are defined to include combinations of networking elements. For extensibility, grouping objects may be a composition of other grouping objects as well. As such, a hierarchy of grouping object may be defined, and may be visualized as a forest data structure where both very-deep and very-wide hierarchies are possible.

Given a current state of all grouping objects, for any network configuration change that impacts grouping membership, the network controller identifies all high level grouping objects in the hierarchy that will be updated. The nature of computation involved in determining grouping membership is incremental (e.g., for each given network configuration update) and iterative (e.g., as each given network configuration update is propagated to each grouping object in the hierarchy). Existing solutions leverage the incremental nature of computing grouping membership, such as by maintaining a current state and computing the difference resulting from each successive network configuration update on top of the current state. However, these techniques can become inefficient when large amounts of network configuration updates need to be processed, as each successive network configuration update cannot be processed until the preceding network configuration update has been propagated to all grouping objects in the hierarchy.

Accordingly, there is a need in the art for improved techniques of determining grouping membership by a network controller based on network configuration updates.

SUMMARY

Herein described are one or more embodiments of a method for computing grouping object memberships in a network. In certain embodiments, the method includes: receiving a plurality of network configuration updates; identifying delta updates to a plurality of grouping objects based on the plurality of configuration updates; determining a parallel processing arrangement for the delta updates based on dependencies in a directed graph comprising representations of the plurality of grouping objects; processing the delta updates according to the parallel processing arrangement in order to determine memberships of the plurality of grouping objects; and distributing one or more updates to one or more endpoints based on the memberships of the plurality of grouping objects.

Also described herein are embodiments of a computer system, wherein software for the computer system is programmed to execute the method described above for computing grouping object memberships in a network.

Also described herein are embodiments of a non-transitory computer readable medium comprising instructions to be executed in a computer system, wherein the instructions when executed in the computer system perform the method described above for computing grouping object memberships in a network.

DETAILED DESCRIPTION

Figure 1:
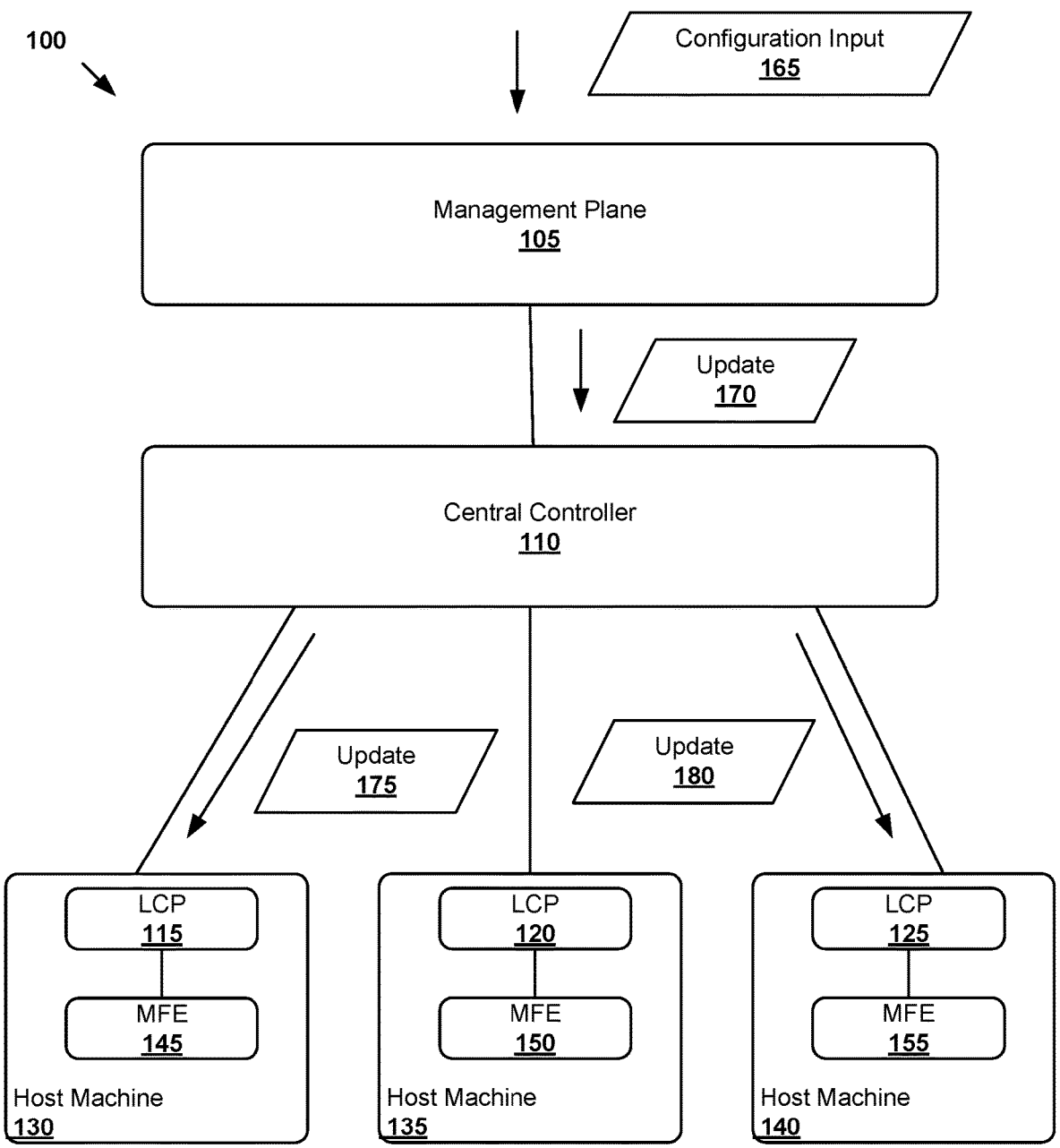
FIG. 1 is a block diagram of a network control system for a virtual network.

Embodiments presented herein relate to a differential dataflow approach for computing grouping membership in network controllers. For example, grouping objects may be defined by a user, such as an administrator, to include sets of computing entities. A grouping object may include, for example, IP addresses, ports, MAC addresses, L2 logical switches, L3 logical routers, and/or the like. A grouping object may also or alternatively include other grouping objects. In some embodiments, grouping objects are assigned dynamic definitions such that membership is determined by evaluating one or more criteria, while in other embodiments the members of a grouping object are explicitly defined. Grouping objects may be referenced in security policies, such as a policy that restricts outbound network connections from members of a given grouping object to endpoints external to the data center.

A network controller may compute membership of grouping objects and distribute the membership information to endpoints in the network for use in applying security policies. In some embodiments, updates in the network may result in changes to membership of grouping objects. For example, changes to definitions of grouping objects may affect membership of the grouping objects. New entities joining the network and entities leaving the network may also affect membership of grouping objects. Furthermore, various configuration changes may affect the membership of grouping objects, such as installation of applications, inbound and outbound network connections, and/or the like.

If an update results in a change to membership of a given grouping object, there may also be an impact to other grouping objects that incorporate the given grouping object. For example, if Group2 includes Group1 and an update results in a membership change for Group1, then the membership of Group2 may also be affected. Rather than simply processing each update sequentially, and waiting until memberships of all grouping objects have been updated based on one update before moving to the next update, embodiments of the present disclosure involve determining a parallel processing arrangement for computing memberships of grouping objects based on updates. In particular, the impact of each given update on memberships of grouping objects is broken into smaller delta updates, where each delta update is a change to a single grouping object (e.g., adding an IP address to membership of a grouping object). It is noted that in some embodiments a delta update may impact multiple fields for a given object, such as by adding multiple IP addresses and/or removing multiple IP addresses.

If a given delta update to a particular grouping object depends on another delta update to another grouping object, then the other delta update will need to be performed before the given delta update. A directed graph may store dependencies between grouping objects, where each edge indicates a direction of a dependency, such as if one grouping object incorporates another grouping object. The directed graph may be used to determine which delta updates can be performed in parallel based on a determination of which delta updates are dependent on others. As such, grouping object membership can be computed more efficiently by utilizing a parallel processing arrangement on one or more processors.

FIG. 1 is a block diagram of a network control system 100 including a central controller 110 (i.e., a network controller) that implements embodiments described herein. As shown, network control system 100 includes a management plane 105, a central controller 110, and multiple local controllers (also called the local control plane (LCP)) 115-125 that operate on host machines 130-140. In addition, each of host machines 130-140 includes a managed forwarding element (MFE) 145-155 that processes data traffic according to configuration information received from their respective controllers 115-125.

Though shown as a single entities, it should be understood that both management plane 105 and central controller 110 may be implemented as a distributed or clustered systems. That is, management plane 105 may include multiple computing devices that implement management plane functions, and a central control plane may include multiple central controller computers or virtual machines or containers (or other logical compute instances (including controller 110) that implement central control plane functions. In some embodiments, each centralized controller includes both management plane and central control plane functions (e.g., as separate applications or functions).

In some embodiments, management plane 105 is responsible for receiving logical network configuration inputs 165 (e.g., through an application programming interface). Users (e.g., network administrators) may input logical network configuration data through, e.g., a command-line interface, a graphical user interface, etc. Each logical network configuration for each logical network, in some embodiments, may include data defining one or more logical forwarding elements, such as logical switches, logical routers, etc. This configuration data may include information describing the logical ports (e.g., assigning media access control (MAC) and/or Internet protocol (IP) addresses to logical ports) for these logical forwarding elements, how the logical forwarding elements interconnect, various service rules (such as distributed firewall rules), etc. Each of these pieces of configuration data, including logical forwarding elements, logical ports, service rules, rule sets, etc., may be referred to as a logical entity.

Management plane 105 receives logical network configuration input 165 and generates desired state data that specifies how the logical network should be implemented in the physical infrastructure. In some embodiments, this data includes a description of the logical forwarding elements and logical ports in a uniform format (e.g., as a set of database records or another format). When users provide configuration changes (e.g., creating or deleting logical entities, modifying properties of logical entities, changing relationships between logical entities, defining and modifying grouping objects, etc.), the changes to the desired state are distributed as logical network updates 170 to central controller 110.

Central controller 110 receives updates 170 from management plane 105, and is responsible for distributing updates to MFEs 145-155 that it manages (e.g., via local controllers 115-125). In some embodiments, central controller 110 is part of a central control plane cluster, with each controller in the cluster managing a different set of MFEs. Implementing a central control plane as a cluster, as well as various sharding techniques for distributing data by a clustered central control plane, is described in more detail in U.S. Pat. No. 10,447,535, the contents of which are incorporated herein by reference in their entirety.

Figure 2:
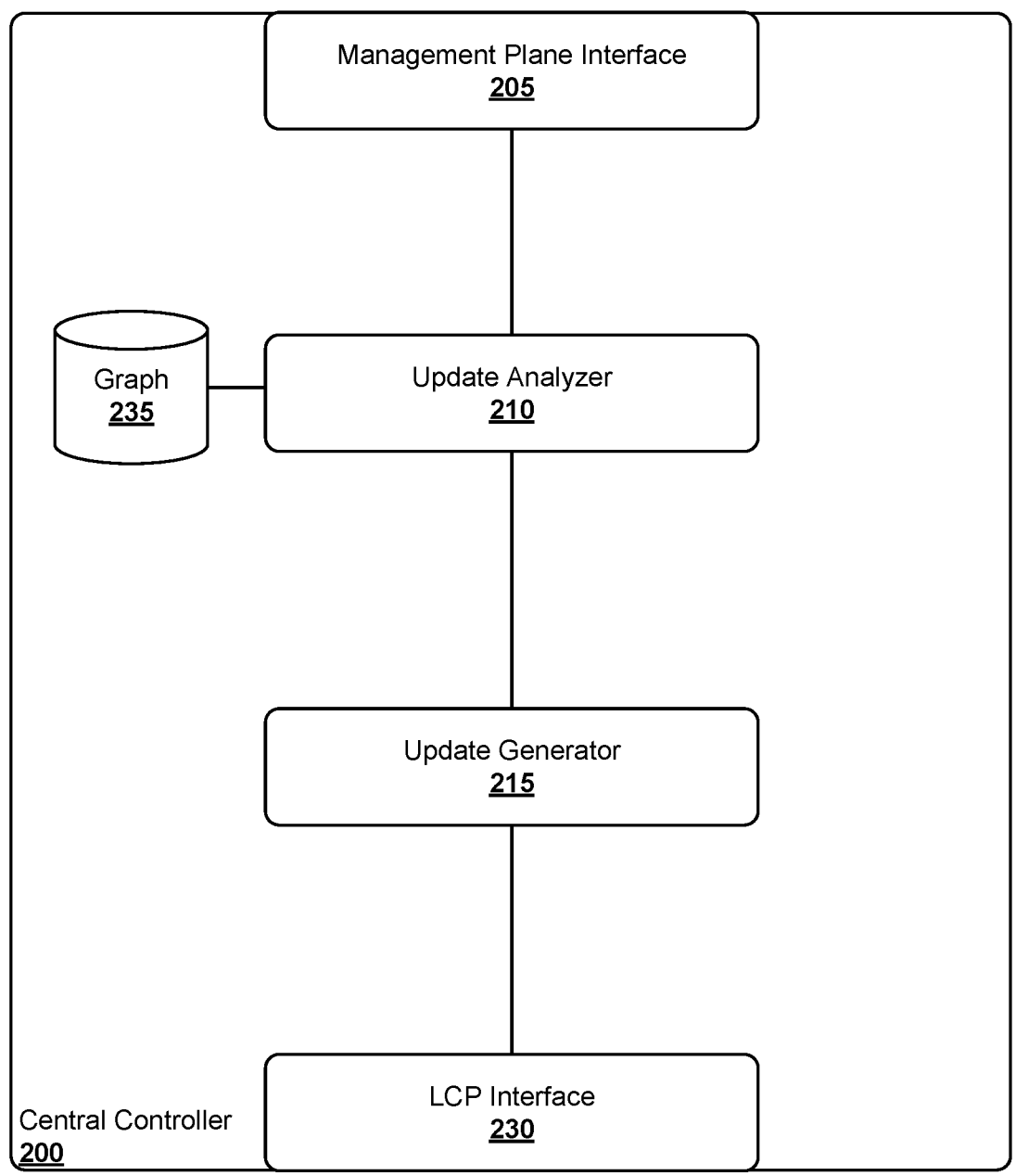
FIG. 2 is a block diagram of a central network controller of FIG. 1.

Central controller 110 receives update 170 to the desired state and, determines the logical entities in the logical network that need to be updated based on update 170. According to embodiments of the present disclosure, central controller 110 determines updates to grouping object membership based on update 170, as well as based on other updates in the network, using a parallel processing arrangement as described in more detail below with respect to FIGS. 2-7. Central controller 110 then generates state updates (e.g., updates 175 and 180) based on update 170, and based on the updated grouping object memberships, for the local controllers of the corresponding MFEs of a span of each logical entity to be updated, and sends the updates to the corresponding local controllers. For example, central controller 110 may determine that MFEs 145 and 155 need to be updated with new membership information for one or more grouping objects, and sends updates 175 and 180 to local controllers 115 and 125, respectively. FIG. 2, described below, conceptually illustrates the architecture of a central controller of some embodiments.

In some embodiments, local controllers 115-125 are responsible for translating the received updates into configuration data formatted for their respective MFEs 145-155. In some embodiments, the local controller is a daemon that operates in the virtualization software of the host machine, as does the MFE. In other embodiments, the local controller and MFE may operate within a VM that hosts multiple containers for one or more logical networks. In some such embodiments, a first local controller and MFE operate in the virtualization software on the host machine while a second local controller and MFE operate in the container host VM (or multiple such controllers/MFE operate in multiple container host VMs).

In addition, while in some embodiments all MFEs in the physical infrastructure are of the same type (and thus require data in the same format), in other embodiments the physical infrastructure may include multiple different types of MFEs. For instance, some embodiments include both hosts with kernel virtual machine (KVM) virtualization software with a flow-based MFE and hosts with virtualization software with a feature-based MFE. Such different types of MFEs require different data formats from the local controller. As such, in some embodiments, local controllers 115-125 are configured to translate the received updates into the specific format required by their MFEs.

As mentioned, FIG. 2 conceptually illustrates the architecture of a central controller 200 of some embodiments, such as central controller 110 of FIG. 1. Central controller 200 includes a management plane interface 205, an update analyzer 210, an update generator 215, and a local control plane interface 230.

In addition, the central controller 200 stores (e.g., in volatile memory, such as RAM) one or more directed graphs 235 of the current state of one or more logical networks, including a directed graph of grouping objects that stores dependencies between grouping objects.

Management plane interface 205 handles interactions with the management plane. Central controller 200 receives changes in the desired state of one or more logical networks through this management plane interface 205.

Update analyzer 210 receives updates to the desired state and determines whether to generate or modify a directed graph 235. For example, if the received update changes a definition of a first grouping object to include a second grouping object, then update analyzer 210 may update a graph 235 of grouping objects to include a directed edge from the second grouping object to the first grouping object. Update analyzer 210 may then compute updated memberships of the grouping objects based on the received update and any other network updates that have not yet been processed. In an embodiment, update analyzer 210 determines a plurality of delta updates to one or more grouping objects that will result from the received updates and uses the graph 235 of the grouping objects to determine which of the delta updates are dependent on other delta updates. As described in more detail below with respect to FIGS. 3-7, update analyzer 210 determines a parallel processing arrangement for the delta updates based on dependencies among the delta updates, and processes the delta updates according to the parallel processing arrangement. Update analyzer 210 may then determine all the MFEs that need to be updated.

In some embodiments, update analyzer 210 determines the span of each of the logical entities to be updated based on a directed graph 235 and informs update generator 215 of which MFEs, as indicated by the determined spans, need to be updated. Update generator 215 is responsible for distributing updates through local control plane interface 230 to the appropriate local controllers of the determined MFEs. In some embodiments, central controller 200 has a separate channel with each of the local controllers that it manages via local control plane interface 230. Determining MFEs that need to be updated and distributing updates are described in more detail in U.S. Patent Application Publication No. 2018/0123877, the contents of which are incorporated herein by reference in their entirety.

In some examples, one or more firewalls may be updated by central controller 200, such as based on received updates and/or changes to grouping object memberships. Generation and distribution of firewall configuration updates are described in more detail in U.S. Patent Application Publication No. 2017/0317979, the contents of which are incorporated herein by reference in their entirety.

Figure 3:
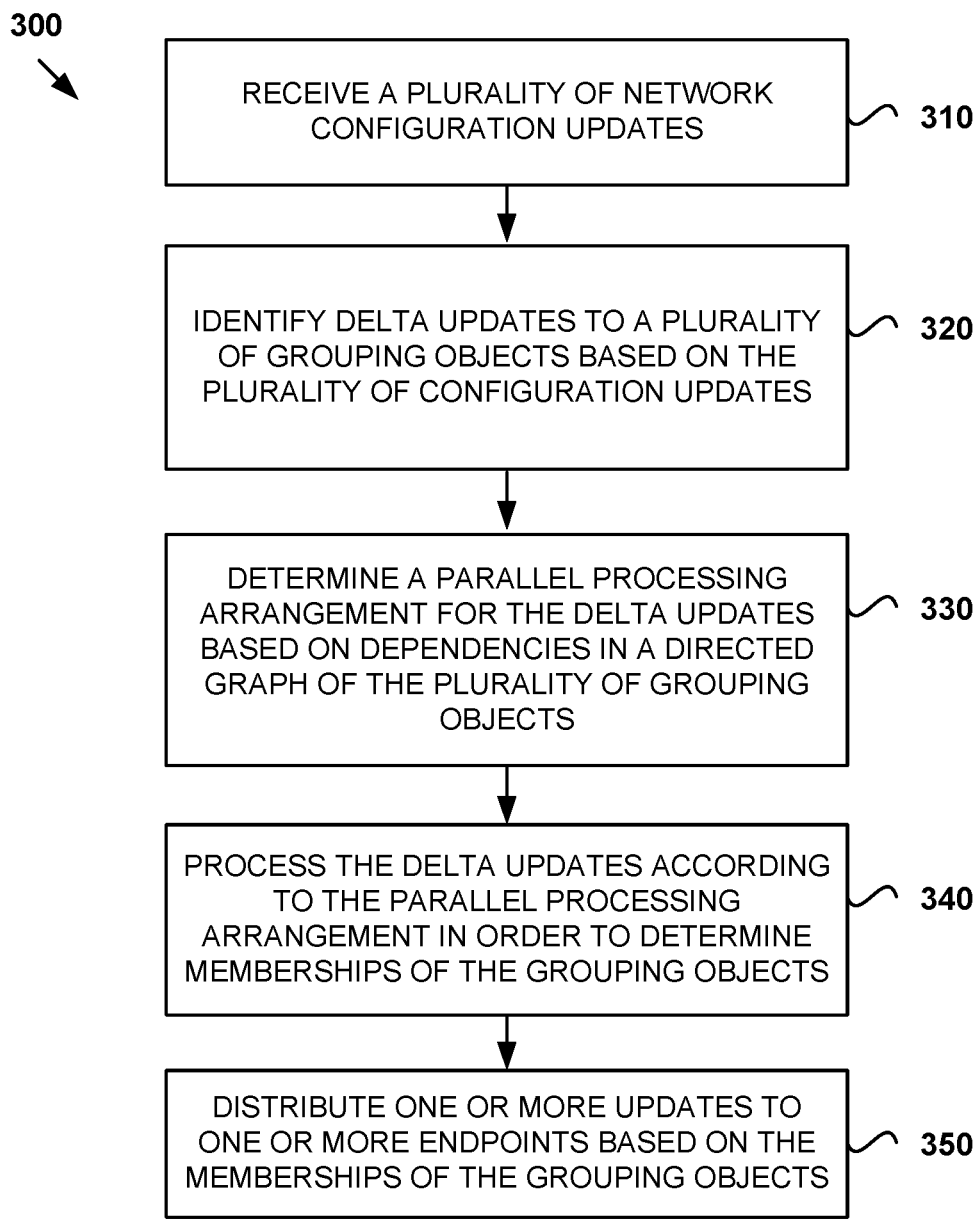
FIG. 3 illustrates example operations for computing grouping membership in network controllers.

FIG. 3 illustrates example operations 300 for computing group membership in network controllers. For instance, operations 300 may be performed by central controller 110 of FIG. 1 and/or central controller 200 of FIG. 2.

At step 310, a plurality of network configuration updates is received. The plurality of network configuration updates may include, for example, changes to grouping object definitions, additions and/or removals of network entities, additions and/or removals of network connections, changes to network entities such as additions and/or removals of services running on network entities, and/or the like.

At step 320, delta updates to a plurality of grouping objects are identified based on the plurality of configuration updates. Each delta update may comprise an incremental update to a grouping object that results from one of the configuration updates. While some delta updates may include a change to membership of a grouping object, other delta updates may not result in such a change, and so may be null. Delta updates are described in more detail below with respect to FIGS. 5 and 7.

At step 330, a parallel processing arrangement is determined for the delta updates based on dependencies in a directed graph of the plurality of grouping objects. The parallel processing arrangement may be based on which delta updates depend on the result of other delta updates. Directed graphs of grouping objects are described in more detail below with respect to FIGS. 4 and 6. Dependencies between delta updates are described in more detail below with respect to FIGS. 5 and 7.

At step 340, the delta updates are processed according to the parallel processing arrangement in order to determine memberships of the grouping objects. In some embodiments, subsets of the delta updates are processed in parallel on one or more processing systems.

At step 350, one or more updates are distributed to one or more endpoints based on the memberships of the grouping objects. For example, a firewall may be configured to implement a security policy that references a grouping object, and the firewall may be provided with the membership of the grouping object for use in enforcing the security policy.

Figure 4:
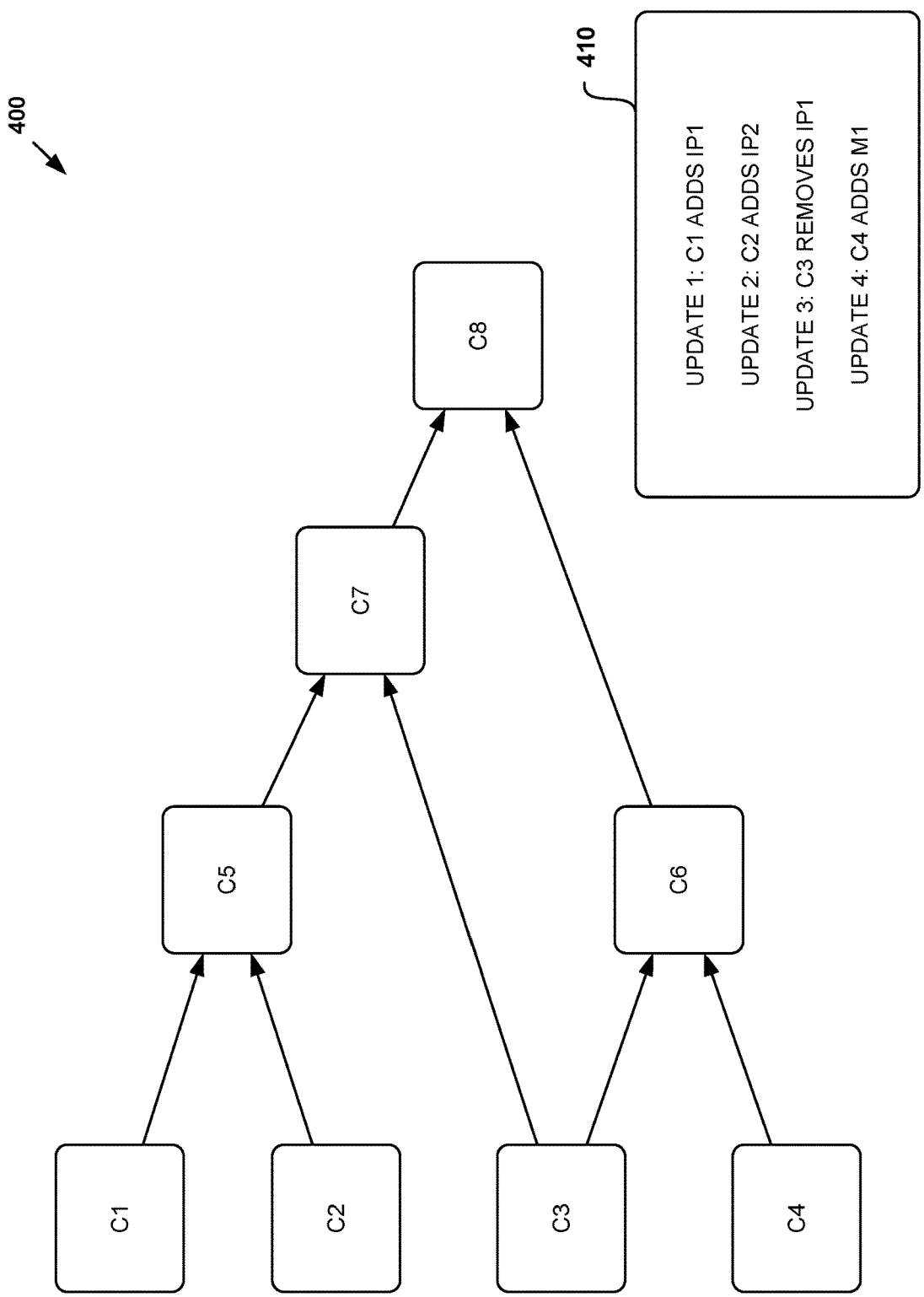
FIG. 4 illustrates an example of hierarchical grouping objects according to embodiments of the present disclosure.

FIG. 4 is an illustration of an example of a directed graph 400 (e.g., graph 235 of FIG. 2) of grouping objects in a logical network.

Directed graph 400 includes grouping objects C1-C8 with directed edges indicating dependencies among them. The dependencies may be based upon definitions of the grouping objects provided by an administrator via the management plane. For example, grouping object C5 may be defined to include grouping object C1.

Grouping objects C1, C2, C3, and C4 do not incorporate any other grouping objects. Grouping object C5 incorporates grouping objects C1 and C2. Grouping object C6 incorporates grouping objects C3 and C4. Grouping object C7 incorporates grouping objects C3 and C5. Grouping object C8 incorporates grouping objects C7 and C6.

The longest dependency chain in directed graph 400 is between grouping objects C1 and C8, including four hierarchical levels (grouping objects C1, C5, C7, and C8). Computing the membership of grouping object C8 requires the memberships of grouping objects C1, C5, and C7 to have already been computed. Similarly, computing the memberships of grouping objects C5, C6, and C7 require the memberships of the grouping objects upon which they depend to have already been computed. As described herein, these dependencies are taken into account when processing network updates to compute grouping object memberships on an ongoing basis so that updates can be processed in parallel.

Updates 410 include a series of network configuration updates that affect memberships of grouping objects C1-C8. In the first update, grouping object C1 adds an IP address referred to as IP1. In the second update, grouping object C2 adds an IP address referred to as IP2. In the third update, grouping object C3 removes the IP address referred to as IP1. In the fourth update, grouping object C4 adds a MAC address referred to as M1.

Updates 410 may occur as a result of network configuration changes. For example, the definitions of particular grouping objects may be updated. In another example, entities with particular IP addresses and/or MAC addresses may be added to the network or removed from the network. In another example, existing entities may be changed such that they do or do not comply with conditions for membership in certain grouping objects.

In one example, an IP address is added to a grouping object C1 as a result of a VM coming online. C1 may represent a logical grouping of VMs that are associated with "Doctors." A firewall rule C5 applies to the grouping objects "Doctors" (C1) and "Nurses" (C2), and indicates that these groups are permitted to access patient records (grouping object C3). C7 is a group of firewall rules entitled "hospital FW rules" that can be managed as a unit by a security administrator responsible for patient care workers, as these rules are of high importance and have regulation compliance implications. C8 is a superset ("all") of security rules that apply to admin staff as well as patient care staff, and indicates that patient records (C3) can be accessed by Doctors and Nurses in addition to rule C5. C8 may be a global list of rules, including rules C6 that relate to administrative functions of the hospital (e.g., billing and HR, and the like). When a new VM comes online assigned to a doctor, the IP address of the new VM is added to grouping object C1. This change is then propagated as described herein through higher tiers of the hierarchy.

As described in more detail below with respect to FIG. 5, a parallel processing arrangement may be determined for updates 410 based on the dependencies in directed graph 400.

Once memberships of grouping objects have been determined using techniques described herein, appropriate information may be sent to all hosts corresponding to the members of the grouping objects. For example, if the rules represented by grouping objects C5 and C7 are turned off or on, all hosts comprising endpoints to which these rules apply may be updated with the change.

Figure 5:
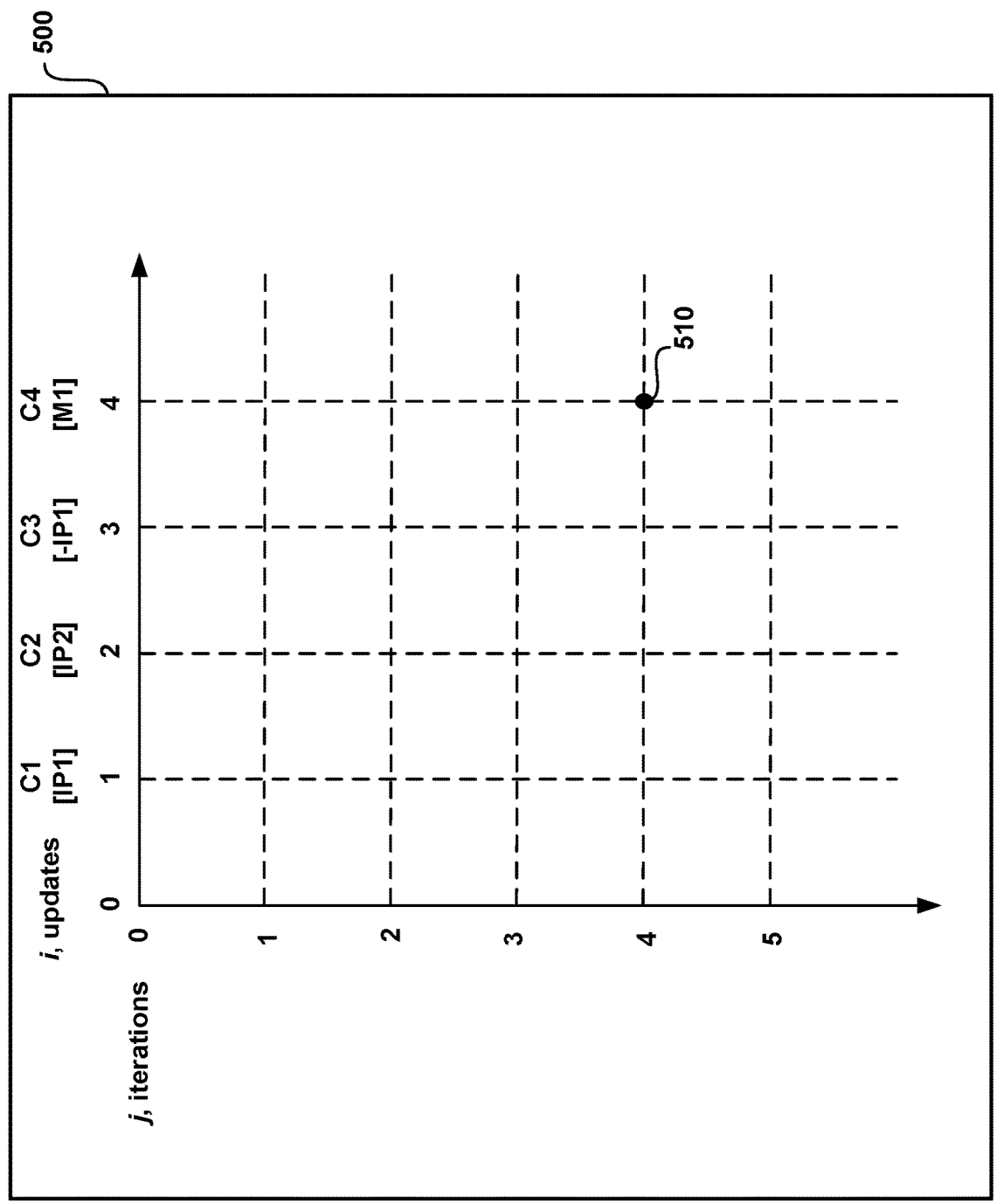
FIG. 5 illustrates an example of a differential dataflow model for computing grouping membership.

FIG. 5 illustrates an example of a differential dataflow model 500 for computing grouping membership. Differential dataflow model 500 includes a graph with an i axis representing updates (e.g., which may correspond to updates 410 of FIG. 4) and a j axis representing iterations of each update, where an iteration j represents propagation of an update to a single grouping object in the hierarchy based on a given update i. A point [I, j] on the graph represents a state where j iterations have been completed for each of updates 0-i.

With respect to the i axis, update 0 may represent the state of grouping object membership prior to updates 1-4. Update 1 represents the addition of IP1 to grouping object C1. Update 2 represents the addition of IP2 to grouping object C2. Update 3 represents the removal of IP1 from grouping object C3. Update 4 represents the addition of M1 to grouping object C4.

With respect to the j axis, iteration 0 represents the application of a given update i to a first grouping object (e.g., the grouping object to which the given update directly relates), while each subsequent iteration represents the application of the given update to each subsequent grouping object in the hierarchy.

For example, for update 1, iteration 0 represents adding IP 1 to grouping object C1, iteration 1 represents adding IP1 to grouping object C5, iteration 2 represents adding IP1 to grouping object C7, and iteration 3 represents adding IP1 to grouping object C8. Iteration 4 represents the final state after update 1 has been propagated to all grouping objects in the hierarchy.

For update 2, iteration 0 represents adding IP2 to grouping object C2, iteration 1 represents adding IP2 to grouping object C5, iteration 2 represents adding IP2 to grouping object C7, and iteration 3 represents adding IP2 to grouping object C8.

For update 3, iteration 0 represents removing IP1 from grouping object C3, iteration 1 represents removing IP1 from grouping object C6, iteration 2 represents removing IP1 from grouping object C7, and iteration 3 represents removing IP from grouping object C8.

For update 4, iteration 0 represents adding M1 to grouping object C4, iteration 1 represents adding M1 to grouping object C6, and iteration 2 represents adding M1 to grouping object C8.

Because the hierarchy has a maximum depth of 4 (e.g., the dependency chain from C1-C8 in FIG. 4), a given update will be guaranteed to have been applied to all grouping objects in the hierarchy after 4 iterations regardless of where in the hierarchy the given update begins. Point 510 (e.g., [4, 4]) represents the state where all of updates 1-4 have been applied to all grouping objects in the hierarchy.

It is noted that not all iterations involve an actual change to membership of a grouping object. For example, if grouping object C6 already included M1 prior to update 4, then iterations 1 and 2 of update 4 would be null (e.g., adding M1 to grouping objects that already included M1). In some embodiments, a reference count is maintained for each given member of each given grouping objects representing the number of references to the given member that are included in the given grouping object. For example, if grouping object C6 already included M1 prior to update 4, then at iteration 1 of update 4 a reference count of M1 for grouping object C6 would be incremented by 1, and at iteration 2 of update 4 a reference count of M1 for grouping object C8 would be incremented by 1. Reference counts may be used to determine when a member should be removed from a grouping object by determining whether the reference count reaches 0.

Each point [i, j] represents the state where all delta updates up to that point have been performed. Delta [state[i, j] is the difference between state [i, j] and a sum of all previous deltas.

For example, state[1,0] is iteration 0 of input 1, state[1,1] is iteration 1 input 1, state[2,0] is iteration 0 of input 2, state[2,1] 1 is iteration 1 of input 2, and so on. The deltas can be computed, for example, as follows:

Delta[state[1,1]]=state[1,1]−state[1,0];

Delta[state[2,0]]=state[2,0]−state[1,0];

Delta[state[2,1]]=state[2,1]−(Delta[state[1,0]]+Delta[state[1,1]]+Delta[state[2,0]]);

and so on.

Accordingly, computing the delta at any given state requires previous deltas to have already been computed and stored. Embodiments of the present disclosure involve storing deltas that have been computed (e.g., up to a threshold amount) for use in computing subsequent deltas.

Delta[state[2,1]] cannot be computed in parallel with Delta[state[1,0]], Delta[state[1,1]], or Delta[state[2,0]] because computing Delta[state[2,1]] requires Delta[state[1,0]], Delta[state[1,1]], and Delta[state[2,0]] to have already been computed. However, Delta[state[1,1]] and Delta[state[2,0]] can be computed in parallel (if Delta[state[1,0]] has already been computed) because neither delta requires the other to have already been completed.

According to certain embodiments, a parallel processing arrangement may involve determining which deltas depend on other deltas and processing in parallel all deltas that do not depend on one another.

As described in more detail below with respect to FIGS. 6 and 7, some updates may involve changing the hierarchy of the directed graph.

Figure 6:
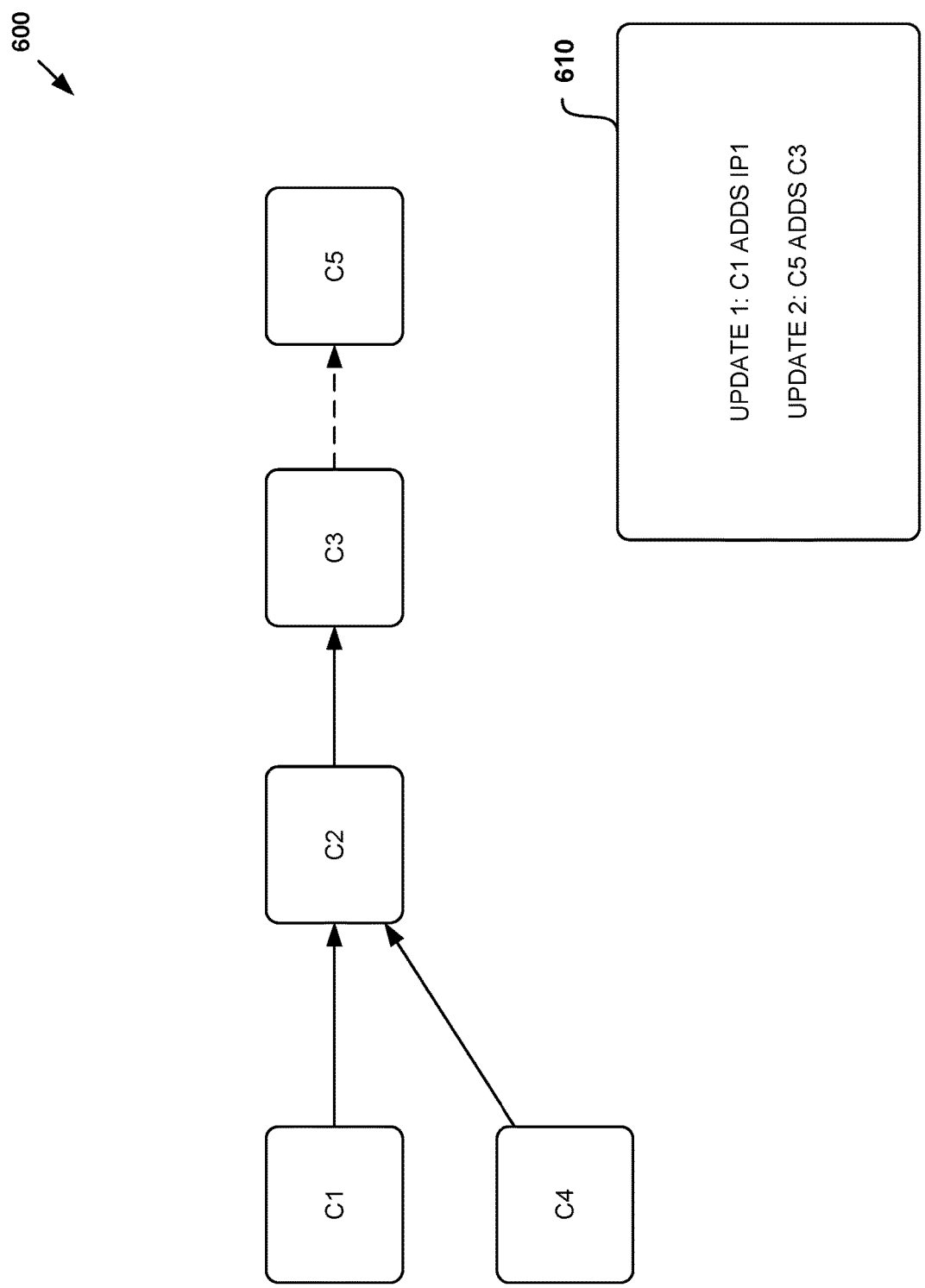
FIG. 6 illustrates another example of hierarchical grouping objects according to embodiments of the present disclosure.

FIG. 6 is an illustration of another example of a directed graph 600 (e.g., graph 235 of FIG. 2) of grouping objects in a logical network.

Directed graph 600 includes grouping objects C1-C5 with directed edges indicating dependencies among them. Grouping objects C1 and C4 do not incorporate any other grouping objects. Grouping object C2 incorporates grouping objects C 1 and C4. Grouping object C3 incorporates grouping object C2. Grouping object C5 does not initially incorporate any other grouping objects, but will incorporate grouping object C3 after update 2.

Updates 610 include a series of network configuration updates that affect memberships of grouping objects C1-C5. In the first update, grouping object C1 adds IP1. In the second update, grouping object C5 adds grouping object C3. As such, update 2 involves changing the hierarchy of directed graph 600 by adding a directed edge from grouping object C3 to grouping object C5

As described in more detail below with respect to FIG. 7, a parallel processing arrangement may be determined for updates 610 based on the dependencies in directed graph 600.

Figure 7:
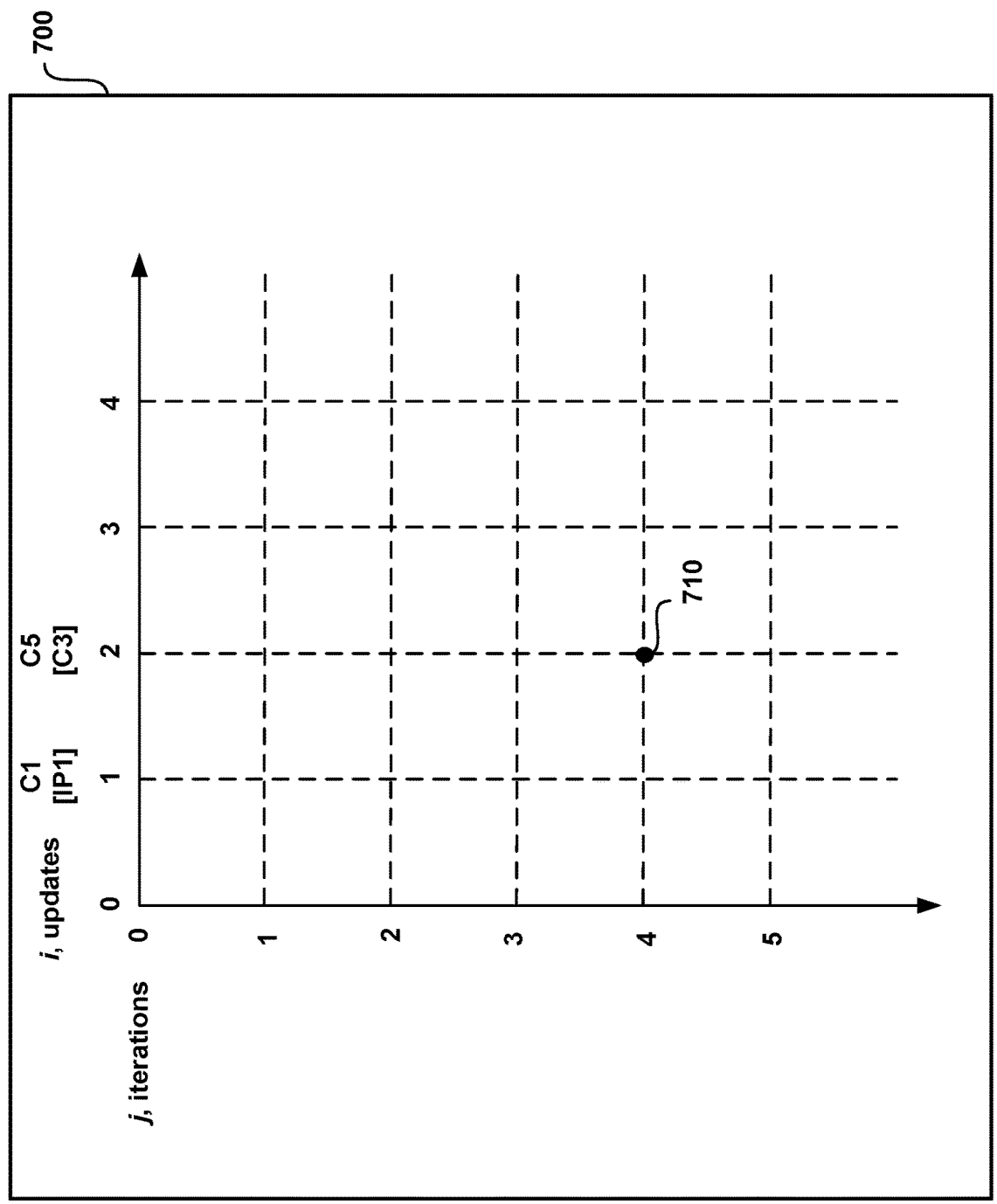
FIG. 7 illustrates another example of a differential dataflow model for computing grouping membership.

FIG. 7 illustrates another example of a differential dataflow model 700 for computing grouping membership. Differential dataflow model 700 includes a graph with an i axis representing updates (e.g., which may correspond to updates 610 of FIG. 6) and a j axis representing iterations of each update, where an iteration j represents an update to a single grouping object in the hierarchy based on a given update i. A point [0] on the graph represents a state where j iterations have been completed for each of updates 0-i.

With respect to the i axis, update 0 may represent the state of grouping object membership prior to updates 1 and 2. Update 1 represents the addition of IP1 to grouping object C1. Update 2 represents the addition of grouping object C3 to grouping object C5.

With respect to the j axis, for update 1, iteration 0 represents adding IP 1 to grouping object C1, iteration 1 represents adding IP 1 to grouping object C2, and iteration 2 represents adding IP1 to grouping object C3.

For update 2, iteration 0 represents adding all members of grouping object C3 to grouping object C5. At state [2,0], grouping object C3 has not yet been updated to include IP1 based on update 1, as this occurs at iteration 2 of update 1 (e.g., state [1, 2]). Accordingly, at state [2, 0], grouping object C5 will be updated to include any other members of grouping object C3, but not IP1. However, in order to ensure that grouping object is ultimately updated to include the full membership of grouping object C3, an additional delta is performed after state [1, 2] to add the updated membership of grouping object C3 to grouping object C5. As such, at state [2, 2], the membership of grouping object C3 is re-determined and then any additional members of grouping object C3 (e.g., IP1) are added to grouping object C5 based on update 2.

Because the hierarchy has a maximum depth of 4 (e.g., the dependency chain from C1-C5 in FIG. 6), a given update will be guaranteed to have been applied to all grouping objects in the hierarchy after 4 iterations regardless of where in the hierarchy the given update begins. Point 710 (e.g., [2, 4]) represents the state where both of updates 1 and 2 have been applied to all grouping objects in the hierarchy.

Given the nature of data, the number of iterations in the system can be capped generically to guarantee that the computation will eventually converge. The system may leverage high/low watermarking techniques to dynamically adjust the value of maximum iterations, after every conciliation (e.g., a conciliation may refer to a reset of the graph, as described in more detail below). For example, the graph may be reset if the graph depth changes beyond the watermark values to ensure correctness.

A parallel processing arrangement may involve determining which deltas depend on other deltas and processing in parallel all deltas that do not depend on one another. For example:

Delta[state[2,0]]=state[2,0]−state[1,0]; and

Delta[state[2,2]]=state[2,2]−(Delta[state[1,0]]+Delta[state[1,1]]+Delta[state[1,2]]+Delta[state[2,0]]+Delta[state[2,1]]).

In this example, Delta[state[2,2]] cannot be processed in parallel with Delta[state[1,0]], Delta[state[1,1]], or Delta[state]1,2]. However, Delta[state[2,0]] can be processed in parallel with Delta[state[1,0]], Delta[state[1,1]], or Delta[state[1,2].

The graph may be periodically reset after a certain number of updates have been processed, after a threshold amount of time has elapsed since a last update was received, or based on other criteria. Resetting the graph may mean setting state[0,0] to the current state and treating the next update to be received as update 1.

Techniques described herein may result in significant performance gains over conventional techniques in which updates are processed sequentially without parallelism. For example, experimental results suggest that utilizing parallel processing arrangements determined using embodiments described herein to compute grouping object memberships may result in processing performance gains of 44-71%.

Figure 8:
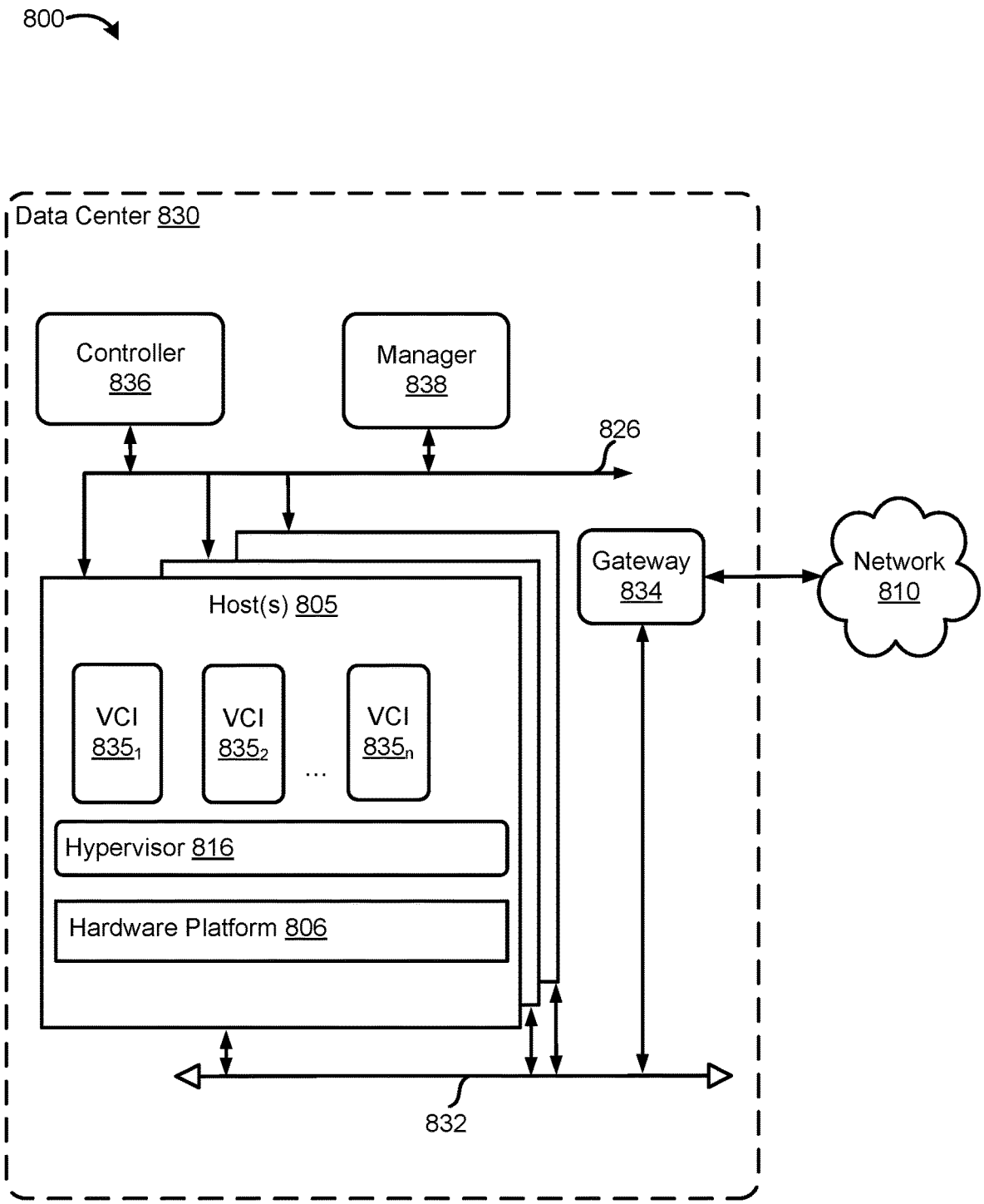
FIG. 8 illustrates an example computing environment in which embodiments of the present disclosure may be implemented.

FIG. 8 depicts example physical and virtual network components with which embodiments of the present disclosure may be implemented.

Networking environment 800 includes data center 830 connected to network 810. Network 810 is generally representative of a network of computing entities such as a local area network ("LAN") or a wide area network ("WAN"), a network of networks, such as the Internet, or any connection over which data may be transmitted.

Data center 830 generally represents a set of networked computing entities, and may comprise a logical overlay network. Data center 830 includes host(s) 805, a gateway 834, a data network 832, which may be a Layer 3 network, and a management network 826. Data network 832 and management network 826 may be separate physical networks or different virtual local area networks (VLANs) on the same physical network.

Each of hosts 805 may be constructed on a server grade hardware platform 806, such as an x86 architecture platform. For example, hosts 805 may be geographically co-located servers on the same rack or on different racks. Host 805 is configured to provide a virtualization layer, also referred to as a hypervisor 816, that abstracts processor, memory, storage, and networking resources of hardware platform 106 into multiple virtual computing instances (VCIs) $835_1$ to $835_n$ (collectively referred to as VCIs 835 and individually referred to as VCI 835) that run concurrently on the same host. VCIs 835 may include, for instance, VMs, containers, virtual appliances, and/or the like.

Hypervisor 816 may run in conjunction with an operating system (not shown) in host 805. In some embodiments, hypervisor 816 can be installed as system level software directly on hardware platform 806 of host 805 (often referred to as "bare metal" installation) and be conceptually interposed between the physical hardware and the guest operating systems executing in the virtual machines. In certain aspects, hypervisor 816 implements one or more logical entities, such as logical switches, routers, etc. as one or more virtual entities such as virtual switches, routers, etc. In some implementations, hypervisor 816 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VCIs 835 may be replaced with containers that run on host 805 without the use of a hypervisor.

Gateway 834 provides VCIs 835 and other components in data center 830 with connectivity to network 810, and is used to communicate with destinations external to data center 830 (not shown). Gateway 834 may be a virtual computing instance, a physical device, or a software module running within host 805.

Controller 836 generally represents a control plane that manages configuration of VCIs 835 within data center 830. Controller 836 may be a computer program that resides and executes in a central server in data center 830 or, alternatively, controller 836 may run as a virtual appliance (e.g., a VM) in one of hosts 805. Although shown as a single unit, it should be understood that controller 836 may be implemented as a distributed or clustered system. That is, controller 836 may include multiple servers or virtual computing instances that implement controller functions. Controller 836 is associated with one or more virtual and/or physical CPUs (not shown). Processor(s) resources allotted or assigned to controller 836 may be unique to controller 836, or may be shared with other components of data center 830. Controller 836 communicates with hosts 805 via management network 826. In some embodiments, controller 836 is representative of central controller 110 of FIG. 1 and/or central controller 200 of FIG. 2, and may be configured to perform operations 300 of FIG. 3.

Manager 838 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 838 is a computer program that executes in a central server in networking environment 800, or alternatively, manager 838 may run in a VM, e.g. in one of hosts 805. Manager8 is configured to receive inputs from an administrator or other entity, e.g., via a web interface or API, and carry out administrative tasks for data center 830, including centralized network management and providing an aggregated system view for a user. In some embodiments, manager 838 is representative of management plane 105 of FIG. 1.

VCIs 835 may be included in grouping objects based on definitions of the grouping objects. For example VCI $835_1$ may have an IP address of IP1, VCI $835_2$ may have an IP address of IP2, and VCI $835_3$ may have a MAC address of M1. As such, subsets of VCIs 835 may be included in grouping objects C1-C8 as described above with respect to FIGS. 4-7.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims. Note that some explanations herein may reflect a common interpretation or abstraction of actual processing mechanisms. Some descriptions may therefore abstract away complexity and explain higher level operations without burdening the reader with unnecessary technical details of well understood mechanisms. Such abstractions in the descriptions herein should be construed as inclusive of the well understood mechanisms.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for computing grouping object memberships in a network, the method comprising:
    receiving a plurality of network configuration updates;
    identifying delta updates to a plurality of grouping objects based on the plurality of network configuration updates, wherein each respective delta update of the delta updates comprises an incremental update to a membership of a single respective grouping object of the plurality of grouping objects based on one of the plurality of network configuration updates;
    determining a parallel processing arrangement for the delta updates based on dependencies in a directed graph comprising representations of the plurality of grouping objects;
    processing the delta updates according to the parallel processing arrangement in order to determine memberships of the plurality of grouping objects; and
    distributing one or more updates to one or more endpoints based on the memberships of the plurality of grouping objects.

2. The method of claim 1, wherein determining the parallel processing arrangement for the delta updates comprises:
    determining which ones of the delta updates depend upon other ones of the delta updates: and
    determining to process in parallel a subset of the delta updates that do not depend upon one another.

3. The method of claim 1, wherein processing the delta updates according to the parallel processing arrangement comprises distributing the delta updates to a plurality of processing systems.

4. The method of claim 1, wherein receiving the plurality of network configuration updates comprises receiving a change to a definition of one of the plurality of grouping objects.

5. The method of claim 4, the change to the definition of the one of the plurality of grouping objects comprises an addition of another grouping object to the one of the plurality of grouping objects.

6. The method of claim 1, wherein determining the parallel processing arrangement for the delta updates comprises utilizing a differential dataflow model.

7. The method of claim 1, wherein distributing the one or more updates to the one or more endpoints based on the memberships of the plurality of grouping objects comprises configuring a firewall to apply a firewall rule based on a subset of the memberships of the plurality of grouping objects.

8. A non-transitory computer-readable medium comprising instructions that, when executed by one or more processors of a computer system, cause the computer system to perform a method for computing grouping object memberships in a network, the method comprising:
    receiving a plurality of network configuration updates;
    identifying delta updates to a plurality of grouping objects based on the plurality of network configuration updates, wherein each respective delta update of the delta updates comprises an incremental update to a membership of a single respective grouping object of the plurality of grouping objects based on one of the plurality of network configuration updates;
    determining a parallel processing arrangement for the delta updates based on dependencies in a directed graph comprising representations of the plurality of grouping objects;
    processing the delta updates according to the parallel processing arrangement in order to determine memberships of the plurality of grouping objects; and
    distributing one or more updates to one or more endpoints based on the memberships of the plurality of grouping objects.

9. The non-transitory computer-readable medium of claim 8, wherein determining the parallel processing arrangement for the delta updates comprises:
    determining which ones of the delta updates depend upon other ones of the delta updates: and
    determining to process in parallel a subset of the delta updates that do not depend upon one another.

10. The non-transitory computer-readable medium of claim 8, wherein processing the delta updates according to the parallel processing arrangement comprises distributing the delta updates to a plurality of processing systems.

11. The non-transitory computer-readable medium of claim 8, wherein receiving the plurality of network configuration updates comprises receiving a change to a definition of one of the plurality of grouping objects.

12. The non-transitory computer-readable medium of claim 11, the change to the definition of the one of the plurality of grouping objects comprises an addition of another grouping object to the one of the plurality of grouping objects.

13. The non-transitory computer-readable medium of claim 8, wherein determining the parallel processing arrangement for the delta updates comprises utilizing a differential dataflow model.

14. The non-transitory computer-readable medium of claim 8, wherein distributing the one or more updates to the one or more endpoints based on the memberships of the plurality of grouping objects comprises configuring a firewall to apply a firewall rule based on a subset of the memberships of the plurality of grouping objects.

15. A system, comprising: one or more processors; and a memory comprising instructions that, when executed by the one or more processors, cause the system to perform a method for computing grouping object memberships in a network, the method comprising:
    receiving a plurality of network configuration updates;
    identifying delta updates to a plurality of grouping objects based on the plurality of network configuration updates, wherein each respective delta update of the delta updates comprises an incremental update to a membership of a single respective grouping object of the plurality of grouping objects based on one of the plurality of network configuration updates;

determining a parallel processing arrangement for the delta updates based on dependencies in a directed graph comprising representations of the plurality of grouping objects;

processing the delta updates according to the parallel processing arrangement in order to determine memberships of the plurality of grouping objects; and distributing one or more updates to one or more endpoints based on the memberships of the plurality of grouping objects.

16. The system of claim 15, wherein determining the parallel processing arrangement for the delta updates comprises:

determining which ones of the delta updates depend upon other ones of the delta updates: and determining to process in parallel a subset of the delta updates that do not depend upon one another.

17. The system of claim 15, wherein processing the delta updates according to the parallel processing arrangement comprises distributing the delta updates to a plurality of processing systems.

18. The system of claim 15, wherein receiving the plurality of network configuration updates comprises receiving a change to a definition of one of the plurality of grouping objects.

19. The system of claim 18, the change to the definition of the one of the plurality of grouping objects comprises an addition of another grouping object to the one of the plurality of grouping objects.

20. The system of claim 15, wherein determining the parallel processing arrangement for the delta updates comprises utilizing a differential dataflow model.

* * * * *